United States Patent [19]

Ghisler et al.

[11] Patent Number: 5,230,082
[45] Date of Patent: Jul. 20, 1993

[54] METHOD AND APPARATUS FOR ENHANCING SIGNALLING RELIABILITY IN A CELLULAR MOBILE RADIO TELEPHONE SYSTEM

[75] Inventors: Walter Ghisler, Upplands Vasby; Steinar J. E. A. Dahlin, Jarfalla; Harald Kallin, Sollentuna, all of Sweden

[73] Assignee: Telefonaktiebolaget L M Ericsson, Stockholm, Sweden

[21] Appl. No.: 604,522

[22] Filed: Oct. 25, 1990

Related U.S. Application Data

[63] Continuation-in-part of Ser. No. 568,051, Aug. 16, 1990, abandoned.

[51] Int. Cl.$^5$ .......................... H04Q 7/02; H04Q 9/00
[52] U.S. Cl. .................................. 455/33.2; 455/34.1; 455/54.2; 455/56.1; 379/60
[58] Field of Search .................... 455/33.1, 33.2, 34.1, 455/54.1, 54.2, 56.1; 379/60

[56] References Cited

U.S. PATENT DOCUMENTS

| | | | |
|---|---|---|---|
| 3,714,574 | 1/1973 | Baba et al. ........................ | 455/33.2 |
| 3,913,017 | 10/1975 | Imaseki ............................ | 455/54.1 |
| 4,125,808 | 11/1978 | Graham ............................ | 455/33 |
| 4,144,496 | 3/1979 | Cunningham et al. . | |
| 4,308,429 | 12/1981 | Kai et al. ......................... | 179/2 |
| 4,659,878 | 4/1987 | Dinkins . | |
| 4,723,266 | 2/1988 | Perry . | |
| 4,730,310 | 3/1988 | Acampora et al. . | |
| 4,736,453 | 4/1988 | Schloemer . | |
| 4,765,753 | 8/1988 | Schmidt ........................... | 455/33 |
| 4,771,448 | 9/1988 | Koohgoli et al. . | |
| 4,811,380 | 3/1989 | Spear . | |
| 4,866,710 | 9/1989 | Schaeffer ....................... | 455/33.2 |
| 4,947,452 | 8/1990 | Hattori et al. .................. | 455/33 |
| 4,989,204 | 1/1991 | Shimizu et al. .................. | 455/33.2 |
| 5,038,399 | 8/1991 | Bruckert ........................ | 455/54.1 |
| 5,042,082 | 8/1991 | Dahlin ............................ | 379/60 |
| 5,047,762 | 9/1991 | Bruckert ........................ | 455/56.1 |
| 5,067,147 | 11/1991 | Lee ................................. | 379/60 |
| 5,109,528 | 4/1992 | Uddenfeldt .................... | 379/60 |
| 5,117,502 | 5/1992 | Onoda et al. .................. | 379/60 |

FOREIGN PATENT DOCUMENTS 0318033 5/1989 European Pat. Off. .
0347396 12/1989 European Pat. Off. .

Primary Examiner—Reinhard J. Eisenzopf
Assistant Examiner—Timothy H. Keough
Attorney, Agent, or Firm—Burns, Doane, Swecker & Mathis

[57] ABSTRACT

A method and apparatus for achieving reliable transmission of signalling messages in a cellular system in which the frequency plan, frequency/time slot allocation plan, code channel allocation plan, or dynamic/adaptive channel allocation rule of the system is violated by allowing adjacent base stations to reuse particular frequencies/time slots/channels for signalling a particular mobile station. In situations where signalling messages, such as handoff commands, which are communicated between a base station and a mobile station are not properly received by the mobile station, an alternate communications channel will be established to ensure the reception of these messages. The alternate channel is provided by repeating the message through a channel associated with a base station which has better radio characteristics. The channel selected for transmission of the message by the new base station will be on the same frequency/time slot/code as used by the established connection.

13 Claims, 4 Drawing Sheets

METHOD AND APPARATUS FOR ENHANCING SIGNALLING RELIABILITY IN A CELLULAR MOBILE RADIO TELEPHONE SYSTEM

This is a continuation-in-part of Ser. No. 07/568,051, filed Aug. 16, 1990 now abandoned.

FIELD OF THE INVENTION

The present invention is directed to a cellular mobile radio telephone system which enhances signalling reliability between the base and mobile stations. More particularly, the present invention relates to a method and apparatus whereby a channel reuse plan or a dynamic/adaptive channel allocation rule of the cellular mobile radio telephone system is temporarily modified to allow adjacent base stations to use particular channels not assigned to them to enhance the signalling reliability to the mobile station. The present may be implemented in systems using FDMA, TDMA or CDMA.

BACKGROUND OF THE INVENTION

In cellular mobile radio telephone systems, it is fundamental that a mobile station with an established connection on a radio channel be able to maintain the established connection when moving from one cell served by one base station to another cell served by another base station. It is also desirous that a mobile station within an established connection on a radio channel be able to maintain the established connection within the same cell when that radio channel is subject to increased interference. The process by which a mobile station is able to maintain an established connection when moving from cell to cell is the handoff operation.

According to conventional cellular systems, both FDMA (frequency division multiple access) and TDMA (time division multiple access) using plural frequencies are employed for providing mobile stations within the coverage of the base station with a number of communication channels. In CDMA (code division multiple access), one wide radio frequency band that has no predetermined time slots is shared by all mobile stations. Within that frequency band, plural mobile stations may simultaneously transmit over plural channels by frequency shifting each carrier wave corresponding to a particular mobile station according to a different code. Accordingly, in FDMA, each channel is assigned to a different frequency; in TDMA, each channel is assigned to a corresponding time slot or time slots for transmission over one frequency; and in CDMA, each channel is assigned a different code. Each of these communication channels are typically unique with respect to adjacent base station coverage areas.

Cellular mobile radio telephone systems often require some type of channel use or allocation plan for determining which communication channels are to be used by mobile stations in a particular cell via a corresponding base station. For example, FDMA systems typically include a frequency reuse plan which places restrictions on the reusing of frequencies allocated to adjoining cells. The frequency reuse plan precludes adjacent cells from utilizing the same frequencies in order to avoid problems due to co-channel interference. TDMA systems typically include a frequency/time slot reuse plan which places restrictions on the reusing of combinations of frequencies and time slots allocated to adjacent cells. A plan for reuse of time slots on frequencies in a TDMA system may preclude adjacent cells from utilizing the same time slot of the same frequency in order to avoid problems due to co-channel interference.

Instead of fixed allocation of channels according to a reuse plan, some cellular systems dynamically or adaptively allocate communication channels. All of the channels become a common resource for all cells to be allocated in accordance with prevailing traffic. Nevertheless, the use of the same channels in adjoining or neighbor cells may have to be precluded in order to avoid problems due to interference.

Message signalling, such as commanding a handoff, is usually carried out through communication between the mobile station and the base station with which the mobile station has an established connection. In a known analog cellular network, the base station continuously monitors the signal strength of the call connection with the mobile station, and if the signal strength is determined to be lower than a particular threshold, a central switching control unit will initiate a handoff procedure. A target base station and an associated channel will be determined for the mobile station, and the mobile station will be instructed to tune to the selected channel of the target base station. However, this instruction is sent by the original base station, and if the mobile station has already left the coverage area of this base station or the message is inhibited by interference, the handoff will be unsuccessful, thus leading to a disconnection of the call connection.

U.S. Pat. No. 4,811,380 issued to Spear on Mar. 7, 1989, offers a proposed solution to this problem by disclosing a cellular radio telephone system with dropped call protection. The disclosed system operates in such a manner that if a handoff command sent by a base station is not received by the mobile station, the mobile station determines that the call connection has been lost. The mobile station scans the control channels in order to request a connection via a control channel associated with a base station with the highest signal strength available. This base station is most likely the target base station for the handoff, and the switch controller will request a reconnection of the call. The mobile station thereafter is assigned a traffic channel on a new frequency from the target base station. This procedure requires modifications of presently used cellular standards like TACS, IS-3 and IS-54, before it can be used in such systems.

OBJECTS OF THE PRESENT INVENTION

It is a general object of the present invention to provide a cellular telephone system which achieves greater signalling reliability between base and mobile stations.

Another object of the present invention is to provide a cellular mobile radio system which achieves greater signalling reliability between base and mobile stations but is compatible with many presently installed or systems planned according to applicable standards.

It is a further object of the present invention to provide a cellular telephone system which ensures that handoff commands sent by a land system are received correctly by the mobile station, so that the handoff of a call connection will be successful.

Additional objects of the present invention will become apparent with reference to the following description and the accompanying drawings.

SUMMARY OF THE INVENTION

It is essential that messages, such as handoff commands, which are sent by base stations are received accurately and correctly by mobile stations in a cellular telephone system. The reception of these messages is critical in spite of possible bad transmission quality which may be experienced in a cellular call connection, particularly during a handoff operation. Handoff signalling, as well as other message signalling, necessarily must be transmitted in a more reliable manner than speech, since the loss of the call connection or other trouble in the handling of a call connection is less acceptable to cellular subscribers and operators than casual disturbances to speech within a call connection.

Accordingly, the present invention is directed to a method and apparatus which achieves reliable transmission of signalling messages in the cellular system when the present call connection has poor radio characteristics associated therewith. In a particular embodiment of the present invention, if messages, such as handoff commands, being communicated between a base station and a mobile station are not properly received by the mobile station, an alternate signalling path will be established to ensure the reception of these messages. The alternate signalling path is provided by repeating the message through a communications channel associated with a base station which has better radio characteristics. For example, in a FDMA system the channel selected for transmission of the message by the new base station will be on the same frequency as that used by the present connection. In a TDMA system, the channel selected for transmission of the message by the new base station will be in the same time slot of the same frequency as that used by the present connection. In a CDMA system, the channel selected for transmission of the message by the new base station will be coded in the same way as that used by the present connection. This type of signalling may violate the original channel allocation plan of the cellular system, but is acceptable in order to save the call connection from being disconnected.

A further embodiment of the present invention is directed to specific handoff signalling between the base and mobile stations. A typical problem encountered is when a handoff command has been transmitted by the original base station over a unique communications channel and the handoff command has been acknowledged, however, no new call connection with the target base station has been established because the target base station is too distant or was chosen by mistake. In this situation, the present invention operates to allow the original base station to order that mobile station attempting to communicate on a new channel via the target base to revert to the original base station. During the reversion, this new channel used by the mobile station is associated with the attempted, target base station and not the original base station. Thus, the channel allocation plan of the cellular system is temporarily violated by allowing the original base station to send an order via this new channel.

A further embodiment of the present invention involves a handoff command being transmitted to the mobile station from the target base station on the unique channel normally associated with the original base station of the call connection. This situation occurs when the mobile station does not receive and fails to acknowledge a handoff command sent by the original base station. In this situation, it is advantageous to switch the transmitter of the original base station from the unique channel being utilized to a temporary off state or to a different channel in order to avoid disturbing the signalling occurring between the target base station and the mobile station. Furthermore, in the situation where a handoff to a new channel is performed but no connection is established, the handoff command to revert to the original base station is provided by the original base station on a new channel not normally associated with the original base station as described above. In this case, it is an advantage to switch temporarily the transmission from the target base station from the new channel normally associated with the target base station to an off-state or to a unique channel normally associated with the original base station in order to avoid disturbing the signalling between the original base station and the mobile base station.

A further embodiment of the present invention is directed to handoff signalling in a cellular system using adaptive channel allocation, sometimes called dynamic channel allocation. In such a system, there is no fixed channel plan, and communication channels selected for allocation, i.e., frequencies in an FDMA system, or frequency/time slot combinations in a TDMA system, are those channels having the lowest disturbance level. Conventionally, the handoff order is given by the original base station in such systems. According to the present invention, a handoff order is transmitted by the target base station, either after having sent the order via the original base station first, or directly, without first sending the order via the original base station. One reason for transmitting handoff orders by way of the target base station is that the target base station generally has lower path loss to the mobile station than the original base station.

DETAILED DESCRIPTION OF THE ILLUSTRATED EMBODIMENTS

Figure 1:
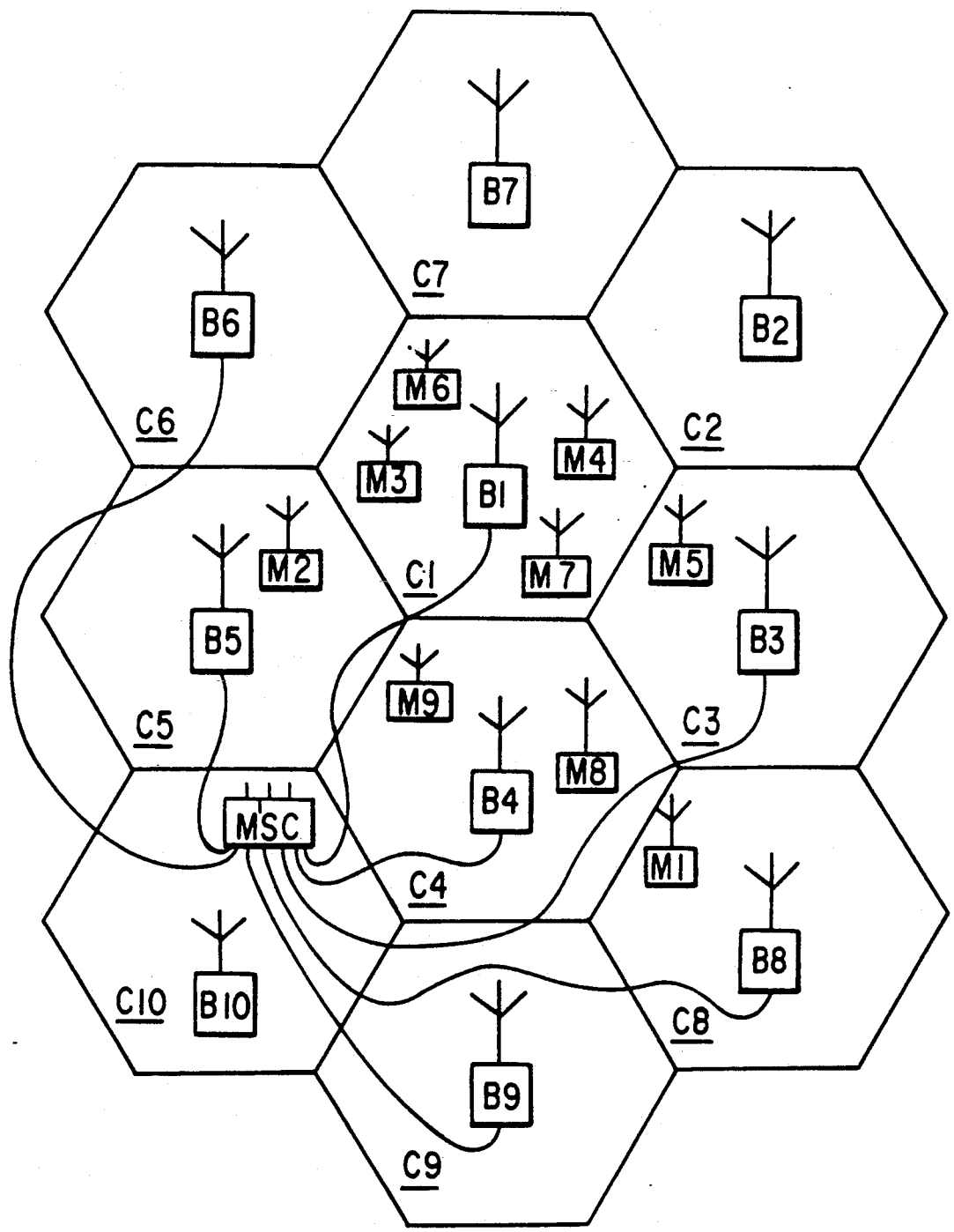
FIG. 1 illustrates part of a cellular telephone system with cells, a mobile switching center, base stations, and mobile stations.

FIG. 1 illustrates ten cells C1 to C10 in a cellular mobile radio system. In actual practice, the method and means according to the present invention are implemented in a cellular mobile radio system comprising many more cells than ten. However, for the purpose of explaining the present invention, ten cells is deemed to be sufficient.

For each of these cells C1 through C10 there is a base station B1 through B10, respectively, with the same number as the cell. FIG. 1 illustrates base stations situated in the vicinity of the center of the cell and having omni-directional antennas. The base stations of adjacent cells may, however be allocated in the vicinity of cell borders and have directional antennas as is well known to those of ordinary skill in the art.

FIG. 1 also illustrates ten mobile stations M1 through M10 which are movable within a cell and from one cell to another cell. In actual practice, the method and means according to the present invention are implemented in a cellular mobile radio system comprising many more mobile stations than ten. In particular, there are usually many more mobile stations than there are base stations. However, for the purpose of explaining the present invention, the use of ten mobile stations is deemed to be sufficient.

The system of FIG. 1 also includes a mobile switching center MSC. The mobile switching center is connected to all ten illustrated base stations by cables. The mobile switching center is also connected, by cables, to a fixed public switching telephone network or similar fixed network with ISDN facilities. All cables from the mobile switching center to the base stations and cables to the fixed network are not illustrated.

In addition to the mobile switching center illustrated, there may also be another mobile switching center connected by cables to other base stations than those illustrated in FIG. 1. Instead of cables, other means may be utilized for base to mobile station switching center communication, e.g. fixed radio links.

The cellular mobile radio system illustrated in FIG. 1 comprises a plurality of radio channels for communication. The system is designed both for analog information, e.g. speech, digitized analog information, digitized speech, and pure digital information. According to the system, the term connection is used for a communication channel established between a mobile station and another mobile station in the same system or another system, or a fixed telephone or terminal in a fixed network connected to the cellular mobile radio system. Thus, a connection may be defined as a call where two persons are able to talk to each other, but also may refer to a data communication channel where computers are exchanging data. Furthermore, a communications channel, or simply a channel, is defined as a particular signalling path between a mobile and a base station. A channel may include, but is not limited to, a specific frequency in a FDMA system, a specific time slot or set of time slots in TDMA, and a specific coding in CDMA.

Figure 2:
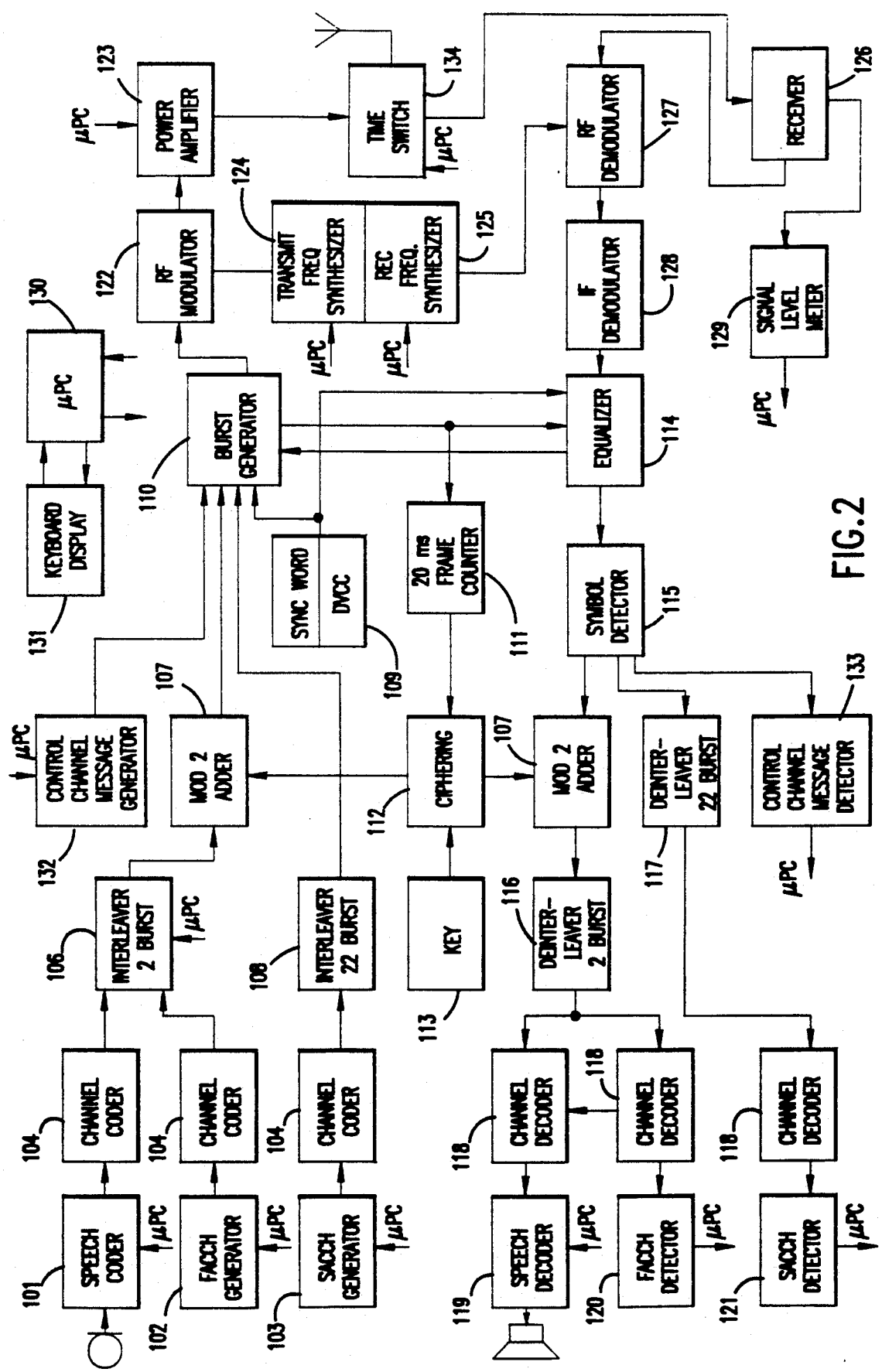
FIG. 2 illustrates a block diagram of a digital mobile station which is utilized in accordance with the present invention.

Referring now to FIG. 2, a mobile station of the digital TDMA type which can be used in a cellular mobile radio system that operates in accordance with the present invention is illustrated. The mobile station works according to the IS-54 standard where control channels are analog but voice/traffic channels are digital. A speech coder 101 is provided for converting the analog signal generated by a microphone into a bit data stream. In the preferred embodiment, the bit data stream is divided into data packages, according to the TDMA principle. A fast associated control channel (FACCH) generator 102 is utilized for the signalling of control and supervision messages between the landbased system and the mobile station and messages between the mobile station and the landbased system. The FACCH message replaces a user frame (speech/data) whenever it is to be transmitted. A slow associated control channel (SACCH) generator 103 provides a continuous channel for the exchange of signalling messages between the base station and the mobile station and vice-versa. A fixed number of bits, e.g. twelve, is allocated to the SACCH for each time slot of the message train. Channel coders 104 are respectively connected to the speech coder 101, FACCH generator 102, and SACCH generator 103 for manipulating the incoming data in order to carry out error detection and correction. The techniques used by the channel coders 104 are convolutional encoding, which protects important data bits in the speech code, and cyclic redundancy check (CRC), wherein the perceptually significant bits in the speech coder frame, e.g. twelve bits, are used for computing a seven bit check.

A two-burst interleaver 106 is connected to the channel coders 104 associated with the speech coder 101 and the FACCH generator 102, respectively. The interleaver 106 is controlled by the microprocessor controller 130 so that at appropriate times user information over a particular speech channel is replaced with system supervision messages over the FACCH. Data which is to be transmitted by the mobile station is interleaved over two distinct time slots. The 260 data bits, which constitute one transmitting word, are divided into two equal parts and are allotted two consecutive time slots. The effects of RAYLEIGH fading will be reduced in this manner. The output of the two-burst interleaver 106 is provided to the input of a modulo-two-adder 107 so that the transmitted data is ciphered bit by bit by logical modulo-two-addition of a pseudo-random bit stream.

The output of the channel coder 104 associated with the SACCH generator 103 is connected to a 22-burst interleaver 108. The 22-burst interleaver 108 is operable for interleaving data transmitted over SACCH over 22 time slots each consisting of 12 bits of information.

The mobile station further includes a Sync Word—DVCC generator 109 for providing the appropriate synchronization word and DVCC which are to be associated with the mobile station. The synchronization word is a 28 bit word used for time slot synchronization and identification. Three different slot identifiers are defined, one for each time slot. The DVCC (digital verification color code) is an 8-bit code which is sent by the base station to the mobile station and vice-versa, for assuring that the proper channel is being decoded.

A burst generator 110 is provided for generating message bursts which are to be transmitted by the mobile station. The burst generator 110 is connected to the outputs of the modulo-two-adder 107, the 22-burst interleaver 108, the sync word/DVCC generator 109, and an equalizer 114, and the control channel message generator 132. A message burst comprising data (260 bits), SACCH (12 bits), sync word (28 bits), coded DVCC (12 bits), and 12 delimiter bits, combine for a total of 324 bits are integrated according to the time slot format specified by the standard EIA/TIA IS-54. Under the selective control of the microprocessor 130, two different types of message bursts are generated by the burst generator 110: control channel message bursts from the control channel message generator 132 and voice/traffic message bursts. The control channel message replaces the SACCH as well as the speech data normally generated in a voice/traffic burst.

The transmitting of a burst, which is equivalent to one time slot, is synchronized with the transmitting of the other two time slots, and is adjusted according to the timing provided by the equalizer 114. Due to time dispersion, an adaptive equalization method is provided in order to improve signal quality. A correlator adjusts to the timing of the received bit stream. The base station is the master and the mobile station is the slave with respect to frame timing. The equalizer 114 detects the incoming timing and synchronizes the burst generator 110. The equalizer 114 is also operable for checking the sync word and DVCC for identification purposes.

A 20 ms frame counter 111 is coupled between the burst generator 110 and the equalizer 114. The frame counter 111 updates a ciphering code utilized by the mobile station every 20 ms, once for every transmitted frame. It will be appreciated that in the disclosed embodiment, three time slots make up one frame. However, the invention is equally applicable to cellular mobile radio systems which utilize any given number of time slots per frame. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst to be transmitted is produced by burst generator 110 and forwarded to an RF modulator 122. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e. 2 bit symbols are transmitted as four possible changes in phase; $\pm\pi/4$ and $\pm 3\pi/4$. The transmitter carrier frequency supplied to the RF modulator 122 is generated by a transmitting frequency synthesizer 124 in accordance with the selected transmitting channel. Before the carrier frequency is transmitted by an antenna, the carrier is amplified by power amplifier 123 and connected to the antenna via a time switch 134. The RF power emission level of the carrier frequency is selected on command by a microprocessor controller 130. The time switch 134 is operated by the microprocessor controller 130 in a TDMA system to connect the power amplifier 123 with the mobile station antenna in synchronization with the transmitting time slot and the receiver 126 with the antenna in synchronization with the receiving time slot.

A receiver carrier frequency is generated in accordance with the selected receiving channel by receiving frequency synthesizer 125. Incoming radio frequency signals are received by receiver 126, the strength of which ar measured by signal level meter 129. The received signal strength value is then sent to the microprocessor controller 130. An RF demodulator 127 which receives the receiver carrier frequency from the receiving frequency synthesizer 125 and the radio frequency signal from receiver 126, demodulates the radio frequency carrier signal, thus generating an intermediate frequency. The intermediate frequency signal is then demodulated by an IF demodulator 128, which restores the original $\pi/4$-DQPSK—modulated digital information.

The restored digital information provided by IF demodulator 128 is supplied to the equalizer 114. A symbol detector 115 converts the received two bit symbol format of the digital data from the equalizer 114 to a single bit data stream. The symbol detector 115 in turn produces three distinct outputs. Any speech data/FACCH data is supplied to a modulo-two-adder 107 and a two-burst deinterleaver 116. The speech data/FACCH data is reconstructed by these components by assembling and rearranging information from two consecutive frames of the received data. Control channel messages are sent to a control message detector 133 which supplies detected control channel information to the microprocessor controller 130. The symbol detector 115 supplies SACCH data to a 22-burst deinterleaver 117. The 22-burst deinterleaver 117 reassembles and rearranges the SACCH data which is spread over 22 consecutive frames.

The two-burst deinterleaver 116 is coupled to two channel decoders 118 for providing the speech data/FACCH data thereto. The convolutionally encoded data is decoded using the reversed principle of coding. The received cyclic redundancy check (CRC) bits are checked to determine if any error has occurred. The FACCH channel decoder furthermore detects the distinction between the speech channel and any FACCH information, and directs the decoders accordingly. A speech decoder 119 processes the received speech data from the channel decoder 118 in accordance with a speech coder algorithm (VSELP), and generates the received speech signal. The analog signal is finally enhanced by a filtering technique. Messages on the fast associated control channel are detected by the FACCH detector 120, and the information is transferred to the microprocessor controller 130.

The output of the 22-burst deinterleaver 117 is provided to a separate channel decoder 118. Messages on the slow associated control channel are detected by SACCH detector 121, and the information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements made. The keyboard and display unit 131 enable an information exchange between the user and the base station.

Figure 3:
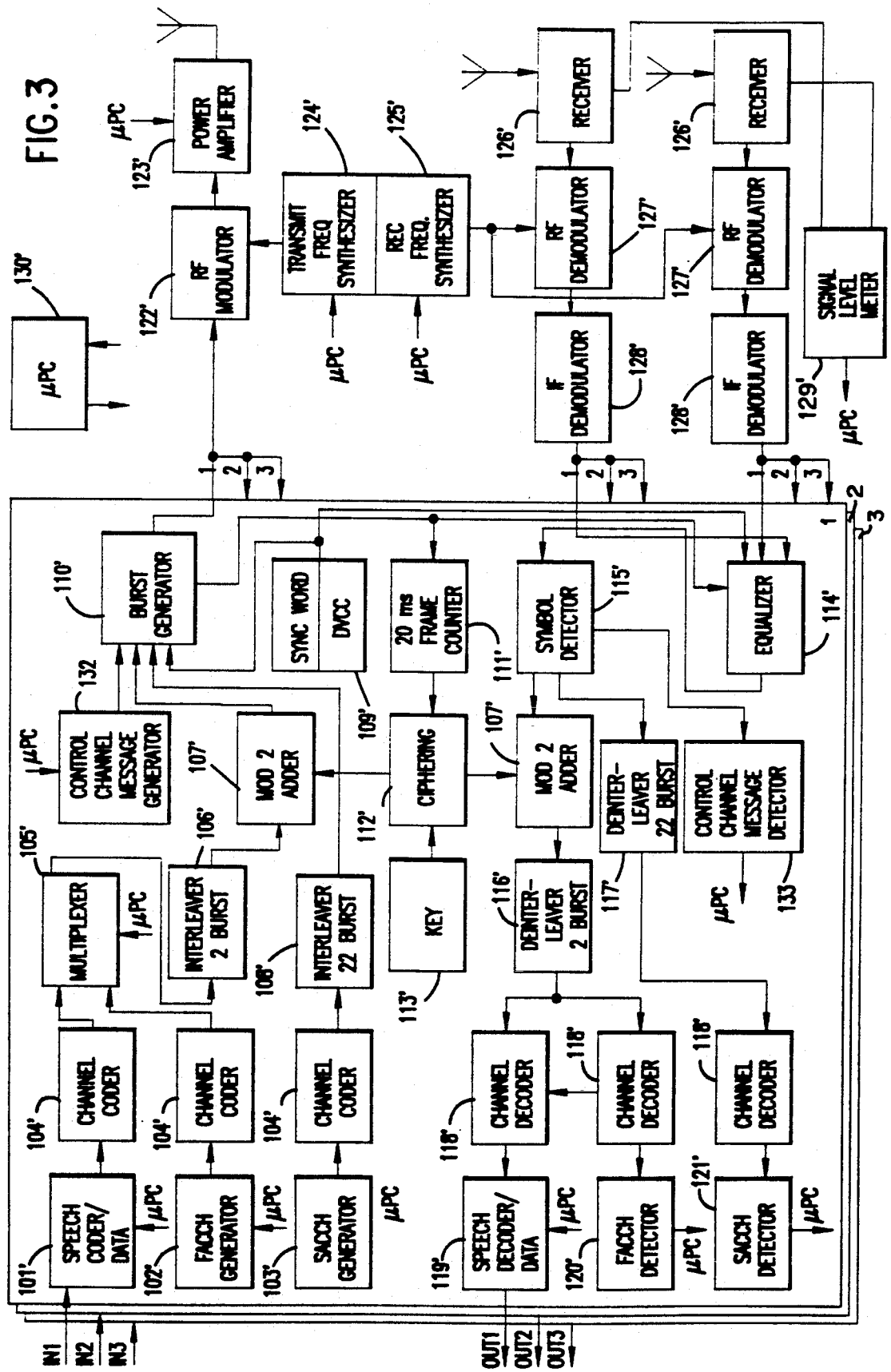
FIG. 3 illustrates a block diagram of a digital TDMA base station which is utilized in accordance with the present invention.

FIG. 3 illustrates a base station of the digital TDMA type that can be employed in a cellular mobile radio system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, minor distinctions between the mobile and base stations. For instance, the base station has two receiving antennas and one transmitting antenna. Associated with each of these receiving antennas are a receiver 126', an RF demodulator 127', and an IF demodulator 128'. Furthermore, the base station does not include a user keyboard and display unit 131 as utilized in the mobile station.

An important objective of planning a cellular system is to achieve a high traffic capacity. In other words, it is desirable to have a large number of subscribers per square kilometer to be able to use the cellular system, while maintaining an acceptable level of service grade and speech quality. Examples of how different channels are assigned to each cell and how the use of these channels is restricted will be described herein.

The extent of the coverage area of a base station is mainly dependent upon the radio transmitter output, the frequency band used, the height and location of the antenna tower, the type of antenna used, the topography of the area, and the radio receiver sensitivity. In conventional systems, the most efficient coverage is obtained from a high elevation site combined with a high output power. By adjusting the output power in the transmitters in the base station, the coverage can be further adjusted as required.

A subset of the entire set of channels utilized by a system is allocated to each cell. Different sets of channels must always be allocated to neighboring cells, since in order to maintain full radio coverage, cells will often overlap one another. Furthermore, using these same channels results in co-channel interference in these overlapping areas. Therefore, a substantial distance between two cells using the same channel subset must always be kept. This distance is called a repetition distance, and the operation of using these same channels by different cells is called channel reuse. As an example, in FDMA systems, channel reuse would be frequency reuse. The restrictions on the reusing of channels allocated to adjoining cells is referred to as the channel reuse plan.

The selection of the channels to be used by each of the base stations is carried out by the transmitting frequency synthesizer 124' and the microprocessor 130'. The microprocessor 130' is operable for selecting, and if necessary varying, the channels to be used by the base station.

Figure 4:
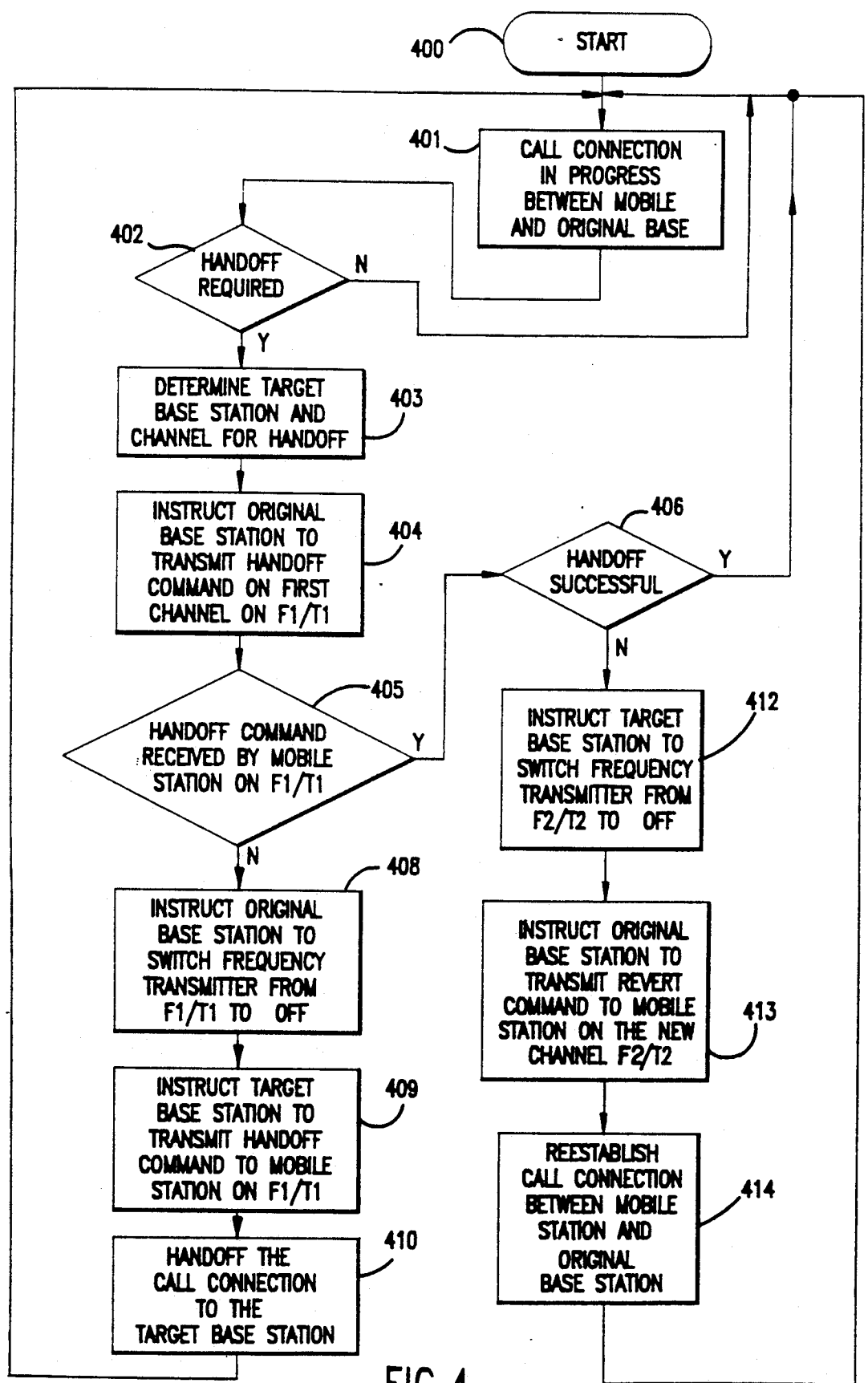
FIG. 4 is a flowchart which illustrates a method for signalling a handoff operation by the mobile switching center according to the present invention.

Referring now to FIG. 4, a handoff technique according to the present invention implemented in a TDMA system is illustrated in flow chart form from the perspective of the mobile switching center.

The flowchart begins at step 401 where a call connection is presumed to be in progress between a mobile station and an original base station. At step 402, a determination is made as to whether the call connection by the mobile station should be handed off to a new cell. The determination of whether or not a handoff is necessary can be performed by using any well known handoff technique. For example, the microprocessor controller 130' associated with the original base station could receive information from the signal level meter 129' indicating that the signal strength from the call connection between the mobile station and the original base station is insufficient for continuing the call connection. The microprocessor controller 130' therefore signals the MSC to indicate that a handoff is required. If a handoff is not necessary, the operation returns to step 401.

If a handoff is necessary, the process proceeds from step 402 to step 403 where a target base station and an associated channel which can receive the handoff of the call connection are designated. If a handoff has been requested by the original base station, the MSC will request the neighboring base stations to send measurement results of the signal strength received from the mobile station. Because the signal strength results are always available in each cell, they will be immediately provided to the MSC, which determines the optimal result. The criteria for choosing an optimal target base station is that the signal strength result must be significantly better than the results received from the original base station requesting the handoff. The MSC determines the target base station and searches for an idle voice channel associated with the target base station. If all voice channels are busy at that particular moment, the next best target base station is used.

The flow proceeds to step 404 where the MSC instructs the original base station to transmit a handoff command on the currently used voice/traffic channel. The command will normally be sent on the voice channel with a call connection in progress. For purposes of explaining the present invention only, it will be assumed that in the context of a TDMA system, the channel utilized for the call connection with the original base station is associated with a unique frequency F1 and a time slot T1. Clearly, similar examples could be described in accordance with other systems, such as FDMA and CDMA.

At step 405, the MSC determines whether the handoff command has been received by the mobile station on the voice/traffic channel associated with frequency F1/time slot T1. The mobile station will typically signal the original base station to acknowledge that the handoff command has been received. If the handoff command is received by the mobile station, the mobile station will tune to the new channel on a new frequency F2 and time slot T2 associated with the target base station. At this point, the MSC determines whether the handoff of the call connection has been successful at step 406. Conventionally, the target base station will inform the MSC that the mobile station is now tuned to the new channel on the new frequency F2 and time slot T2 associated with the target base station. Upon a successful handoff of the call connection, the flow returns to step 401.

If at step 405 the MSC determines that the handoff command was not received by the mobile station on the original base station channel associated with the frequency F1 and time slot T1, the flow proceeds to step 408. Contrary to the channel reuse plan of the system, the new channel to be associated with the target base station is on the frequency F1 and time slot T1 normally reserved for use by the original base station. This is carried out in accordance with signalling from the MSC to the target base station. The microprocessor controller 130' of the target base station in turn instructs the transmitting frequency synthesizer 124' to vary the channel frequency. Using well-known techniques, the time slot T1 of the target base station is synchronized to the mobile station just as mobile stations are synchronized to a base station. Time slots T2 and T3 on the frequency F1 of the target base station must be muted.

At step 408, the MSC instructs the original base station to temporarily discontinue the use of the time slot T1 on the frequency F1. During the time slot T1, the transmitting frequency synthesizer 124' of the original base station is commanded by the associated microprocessor controller 130' to turn off. This switch avoids interference with the handoff command to be sent from the target base station on the channel now associated with the frequency F1 and time slot T1 which was originally associated with the original base station. At step 409, the MSC instructs the target base station to transmit the handoff command to the mobile station on the new channel utilizing the frequency F1 and time slot T1. Thus, a violation of the system's channel reuse plan has occurred. Assuming that the mobile station receives the handoff command from the new channel via the frequency F1 and time slot T1, the call connection will be handed off to the target base station at step 410.

If, at step 406, the MSC determines that the original handoff attempt is not successful, the flow proceeds to step 412. At step 412, the MSC instructs the target base station determined at step 403 to discontinue transmissions on its associated frequency F2 and time slot T2. The transmitting frequency synthesizer 124' of the target base station will be temporarily turned off.

The flow proceeds to step 413 where the MSC instructs the original base station to transmit a revert command to the mobile station on the new channel via the frequency F2 and time slot T2. Assuming that the revert command is received by the mobile station, the call connection will be reestablished between the mobile station and the original base station. At this point of operation, the flow will return to step 401.

It will be appreciated by those of ordinary skill in the art that the present invention should not be limited to handoff commands, but can be utilized to ensure the reliable transmission of any number of messages to a mobile station. The use of the handoff command has been used herein as a practical example of a message command, the reception of which by the mobile station is critical for continuing the call connection. Therefore, the present invention provides a higher probability for successful handoff operations, and in general for more successful signalling between base and mobile stations, thus resulting in a higher reliable operation. Another application of the present invention is to preserve ongoing call connections between a mobile and a malfunctioning base station. In this situation, the MSC orders neighboring base stations to preserve ongoing call connections of the malfunctioning base station by temporarily using channels allocated to the malfunctioning base station, e.g., frequencies in a FDMA system, until a handoff of the mobile station to a neighboring base station on channels allocated to neighboring base stations can occur. Such a modification to the channel allocation plan relates not only to the handoff order but also to all signalling and traffic.

While a particular embodiment of the present invention has been described and illustrated, it should be understood that the invention is not limited thereto since modifications may be made by persons skilled in the art. In particular it should be understood that the invention may be implemented in analog systems or digital systems or combined analog/digital systems. The invention may be implemented in systems using FDMA, TDMA, or CDMA. Thus, depending on the type of system, a channel between a base station and a mobile station may occupy/constitute a complete radio frequency, a time slot of a radio frequency, a code or any part thereof appropriate for the interstation radio signalling in question. The present disclosure contemplates any and all modifications that fall within the sphere and scope of the underlying invention disclosed and claimed herein.

What is claimed is:

1. A method for achieving a handoff of a call connection between a mobile station and a first base station to a second base station in a cellular radio telephone system having a mobile switching center for communicating with said first and second base station and having a predetermined frequency plan in which the frequencies and channels of the first base station in a first cell are different from those of the second base station in a neighboring cell, comprising the steps of:
   transmitting a handoff command from said second base station to said mobile station on a first predetermined channel which violates the predetermined frequency plan, wherein said first predetermined channel is normally assigned to said first base station at the time of said handoff command for the transmission of signals to mobile stations and not normally assigned to said second base station in accordance with the predetermined frequency plan, the handoff command originating from said first base station and being communicated to said second base station via the mobile switch center, and
   determining whether said mobile station transmits radio signals to said second base station in accordance with said handoff command from said second base station.

2. A method according to claim 1, further comprising the step of inhibiting transmission of signals from said first base station on said first predetermined channel while said handoff command is being transmitted from said second base station on said first predetermined channel.

3. A method according to claim 1, further comprising the step of handing off said call connection from said first base station to said second base station in response to an acknowledgment from said mobile station to the said first base station that said handoff command has been received.

4. A method according to claim 1, further comprising the step of transmitting a revert command from said first base station to said mobile station on a second channel which is different from said first channel and is normally assigned to said second base station at the time of said handoff command, said revert command instructing said mobile station to reestablish said call connection between said mobile station and said first base station, in response to said mobile station receiving said handoff command on said first channel and being unsuccessful in establishing said call connection between said mobile station and said second base station.

5. A method according to claim 2, wherein said step of inhibiting includes blocking signals from said first base station on said first channel from being transmitted by a radio transmitter of said first base station.

6. A method according to claim 2, wherein said step of inhibiting transmission of signals from said first base station on said first channel involves switching a radio transmitter associated with said first base station to a channel different than said first channel.

7. A method for achieving a handoff of a call connection between a mobile station and a first base station associated with a first cellular radio coverage area to a second base station associated with a second cellular radio coverage area in a cellular mobile radio communication system having a predetermined frequency plan in which the frequencies and channels of the first base station of the first cellular radio coverage area are different from those of the second base station in the second cellular radio coverage area, comprising the steps of:
   determine whether said call connection between said mobile station and said first base station will require a handoff to said second base station;
   transmitting a first handoff command from said first base station to said mobile station on a first channel normally assigned to said first base station in accordance with the predetermined frequency plan at the time of said first handoff command; and
   transmitting a second handoff command from said second base station to said mobile station on said first channel in violation of the predetermined frequency plan when said mobile station does not receive said first handoff command on said first channel from said first base station.

8. A method according to claim 7, further comprising the step of handing off said call connection between said mobile station and said first base station to said second base station in response to said mobile station receiving said second handoff command on said first channel.

9. A method for achieving a handoff of a call connection between a mobile station and a first base station associated with a first cellular radio coverage area to a second base station associated with a second cellular radio coverage area in a cellular mobile radio communication system, comprising the steps of:
- determining whether said call connection between said mobile station and said first base station will require a handoff to said second base station;
- transmitting a first handoff command from said first base station to said mobile station on a first channel normally assigned to said first base station at the time of said first handoff command; and
- transmitting a second handoff command from said second base station to said mobile station on said first channel normally assigned to said first base station when said mobile station does not receive said first handoff command on said first channel from said first base station;
- wherein said mobile station receives said first handoff command on said first channel and is unsuccessful in establishing said call connection between said mobile station and said second base station on a second channel normally associated with said second base station, further comprising the steps of:
- deactivating transmissions from said second base station on said second channel normally associated with said second base station;
- transmitting a revert command from said first base station to said mobile station on said second channel instructing said mobile station to reestablish said call connection between said mobile station and said first base station.

10. A method according to claim 7, further comprising the step of switching off a radio transmitter associated with said second base station, which provides said second channel, in order to avoid said second base station from disturbing said first base station while using said second channel, in response to said mobile station being unsuccessful in establish said call connection between said mobile station and said second base station.

11. A cellular radio telephone system having at least one mobile station, a first base station associated with a first cellular radio coverage area, a second base station associated with a second cellular radio coverage area, and a mobile switching center, and having a predetermined frequency plan in which the frequencies and channels of the first base station of the first cellular radio coverage area are different from those of the second base station in the second cellular radio coverage area, said system comprising:
- determining means for determining whether and active call connection between said mobile station nd said first base station will require a handoff to said second base station;
- first transmitting means for transmitting a handoff command from said first base station to said mobile station on a first channel associated with said first base station in accordance with the predetermined frequency plan and in response to said determining means determining that a handoff is required; and
- second transmitting means for transmitting a handoff command from a second base station to said mobile station on said first channel in violation of the predetermined frequency plan when said mobile station does not receive said handoff command from said first base station on said first channel.

12. A system according to claim 11, further comprising handoff means of handing off said call connection between said mobile station and said first base station to said second base station in response to said mobile station receiving said handoff command transmitted from said second base station on said first channel.

13. A system according to claim 11, further comprising switching means for switching off a radio transmitter associated with said second base station, which provides said second channel, in order to avoid the use of said second channel by said second base station from disturbing the use of said second channel by said first base station while the first base station sends a revert order to said mobile station, in order to reestablish communication between the mobile station and the first base station.

* * * * *